(12) United States Patent
Wu (10) Patent No.: US 11,421,760 B2
(45) Date of Patent: Aug. 23, 2022

(54) LINEAR ACTUATOR

(71) Applicant: J-STAR MOTOR INDUSTRIAL CO., LTD., Taichung (TW)

(72) Inventor: Wei-Fan Wu, Taichung (TW)

(73) Assignee: J-STAR MOTOR INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 17/454,819

(22) Filed: Nov. 14, 2021

(65) Prior Publication Data

US 2022/0221033 A1    Jul. 14, 2022

(30) Foreign Application Priority Data

Jan. 11, 2021 (CN) .......................... 202120063565.X (51) Int. Cl.
*F16H 25/20* (2006.01)

(52) U.S. Cl.
CPC ....... *F16H 25/20* (2013.01); *F16H 2025/209* (2013.01); *F16H 2025/2031* (2013.01); *F16H 2025/2075* (2013.01)

(58) Field of Classification Search
CPC ............... F16H 25/20; F16H 2025/209; F16H 2025/2075; F16H 2025/2031
See application file for complete search history.

(56) References Cited

U.S. PATENT DOCUMENTS

| 2009/0247365 | A1* | 10/2009 | Di Stefano | B60T 13/02 477/197 |
| 2009/0293655 | A1* | 12/2009 | Tseng | F16H 25/2015 74/89.37 |
| 2013/0112022 | A1* | 5/2013 | Shimizu | F16H 25/12 74/89.34 |
| 2019/0376585 | A1* | 12/2019 | Buchanan | F16H 25/20 |
| 2020/0141474 | A1* | 5/2020 | Lim | F16H 25/2204 |
| 2021/0114486 | A1* | 4/2021 | Becker | F16H 1/16 |
| 2021/0197784 | A1* | 7/2021 | Drumm | F16H 25/2025 |
| 2021/0215237 | A1* | 7/2021 | Wei | F16H 63/00 |

FOREIGN PATENT DOCUMENTS

JP         2005188574 A  *  7/2005

* cited by examiner

*Primary Examiner* — David M Fenstermacher
(74) *Attorney, Agent, or Firm* — CKC & Partners Co., LLC (57) ABSTRACT

A linear actuator includes a case, a driving module, a main gear, a reinforcing seat, and a threaded shaft. The case includes a first receiving space, a second receiving space, and a bore. The driving module is disposed within the first receiving space. The main gear is disposed within the second receiving space and linked with the driving module. The reinforcing seat is disposed within the second receiving space and connected to the main gear. The reinforcing seat includes a reinforcing seat body, and a reinforcing seat flange connected to the reinforcing seat body and engaged with the annular groove. One end of the threaded shaft passes through the bore and the main gear to be restricted by the reinforcing seat, and the threaded shaft is linked with the main gear.

10 Claims, 7 Drawing Sheets

Fig. 7 ical field

The present disclosure relates to a linear actuator. More particularly, the present disclosure relates to a linear actuator having a reinforcing seat.

Description of Related Art

Linear actuators are wildly used in lots of fields, and the most common mechanism thereof is to use a motor to drive a threaded shaft such that a driven device can be driven by the linear actuator to do a linear movement such as the elevation of an elevating table. Since an axial force will be generated when rotating the threaded shaft, and the axial force will directly or indirectly push the case, the thickness of the case has to be thick enough to prevent damages; as a result, the weight of the linear actuator as well as the cost are increased.

Based on the aforementioned problems, how to ease the pressure on the case when operating the linear actuator becomes a pursued target for practitioners.

SUMMARY

According to one aspect of the present disclosure, a linear actuator is provided. The linear actuator includes a case, a driving module, a main gear, a reinforcing seat, and a threaded shaft. The case includes a first receiving space, a second receiving space communicated with the first receiving space, a bore communicated with the second receiving space, and an annular groove located at the second receiving space along an axial direction of the bore. The driving module is disposed within the first receiving space. The main gear is disposed within the second receiving space and linked with the driving module. The reinforcing seat is disposed within the second receiving space and connected to the main gear. The reinforcing seat includes a reinforcing seat body, and a reinforcing seat flange connected to the reinforcing seat body and engaged with the annular groove. One end of the threaded shaft passes through the bore and the main gear to be restricted by the reinforcing seat, and the threaded shaft is linked with the main gear.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as being "disposed on", "connected to" or "coupled to" another element, it can be directly disposed on, connected or coupled to another element, or it can be indirectly disposed on, connected or coupled to another element, that is, intervening elements may be present. In contrast, when an element is referred to as being "directly disposed on", "directly connected to" or "directly coupled to" another element, there are no intervening elements present.

In addition, the terms first, second, third, etc. are used herein to describe various elements or components, these elements or components should not be limited by these terms. Consequently, a first element or component discussed below could be termed a second element or component.

Figure 1:
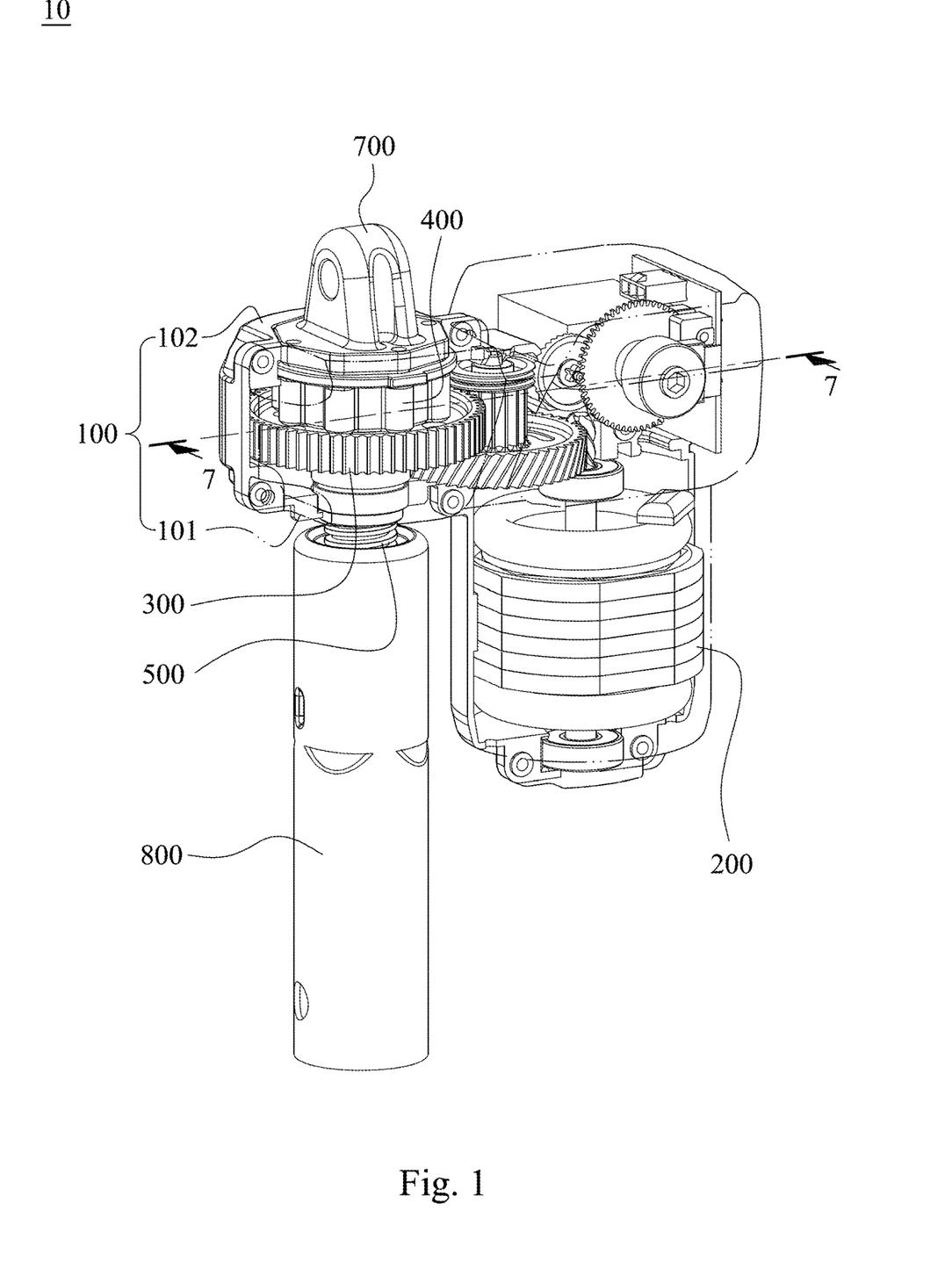
FIG. 1 shows a three-dimensional schematic view of a linear actuator according to one embodiment of the present disclosure.
Figure 2:
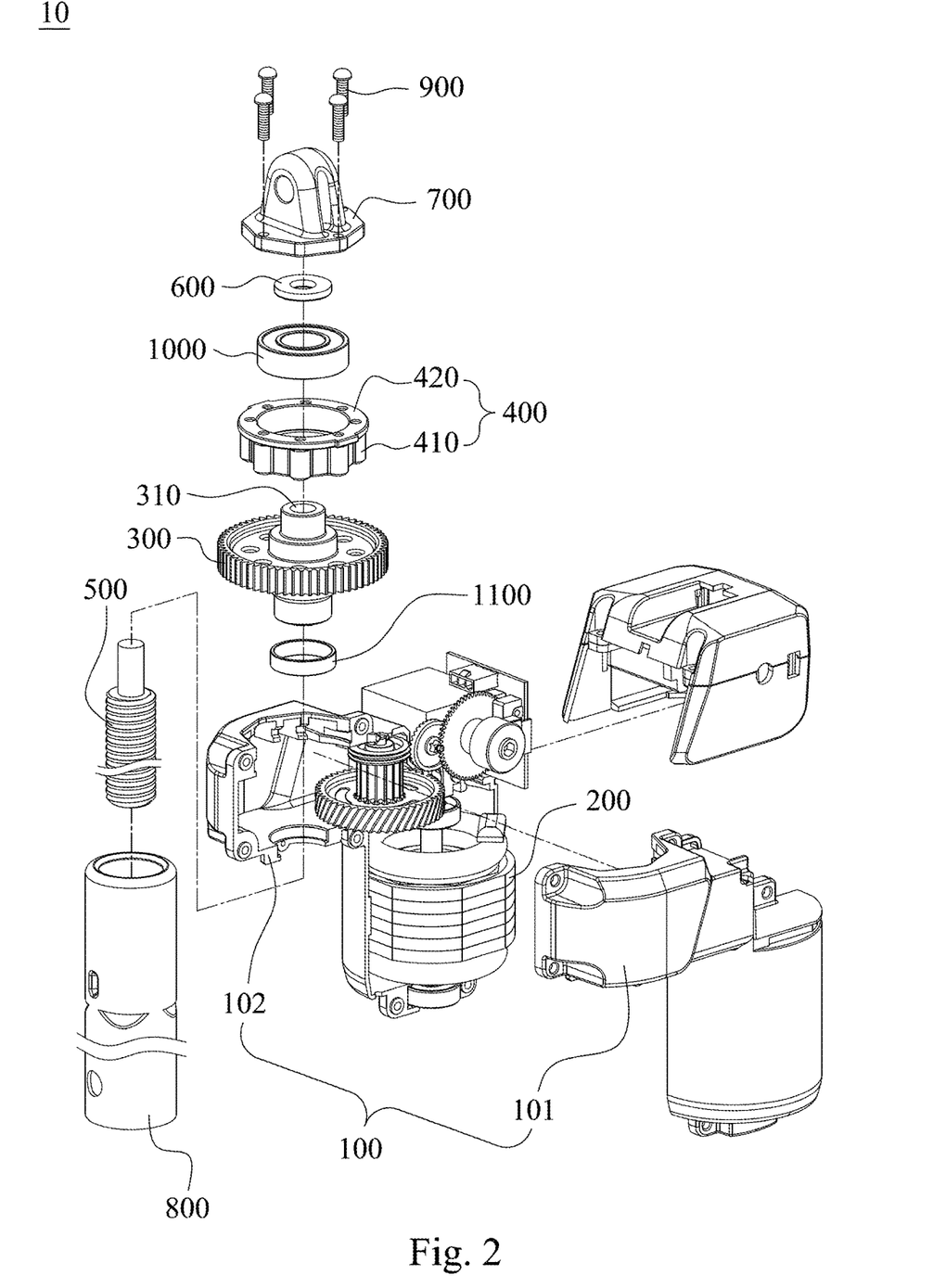
FIG. 2 shows a partial exploded view of the linear actuator of the embodiment of FIG. 1.
Figure 3:
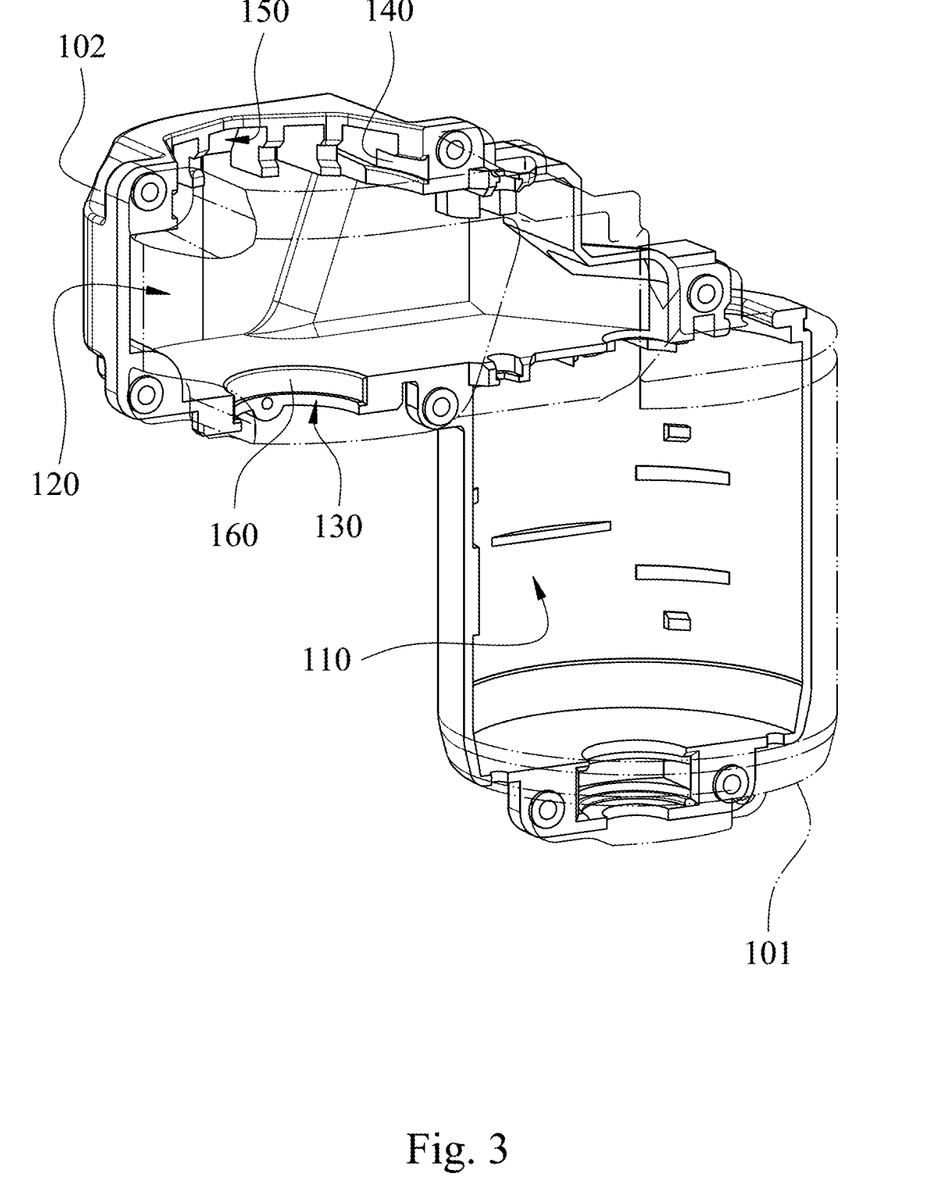
FIG. 3 shows a three-dimensional schematic view of a case of the linear actuator of the embodiment of FIG. 1.

FIG. 1 shows a three-dimensional schematic view of a linear actuator 10 according to one embodiment of the present disclosure. FIG. 2 shows a partial exploded view of the linear actuator 10 of the embodiment of FIG. 1. FIG. 3 shows a three-dimensional schematic view of a case 100 of the linear actuator 10 of the embodiment of FIG. 1. Please refer to FIGS. 1 to 3, the linear actuator 10 includes a case 100, a driving module 200, a main gear 300, a reinforcing seat 400, and a threaded shaft 500. The case 100 includes a first receiving space 110, a second receiving space 120 communicated with the first receiving space 110, a bore 130 communicated with the second receiving space 120, and an annular groove 140 located at the second receiving space 120 along an axial direction of the bore 130. The driving module 200 is disposed within the first receiving space 110. The main gear 300 is disposed within the second receiving space 120 and linked with the driving module 200. The reinforcing seat 400 is disposed within the second receiving space 120 and connected to the main gear 300. The reinforcing seat 400 includes a reinforcing seat body 410, and a reinforcing seat flange 420 connected to the reinforcing seat body 410 and engaged with the annular groove 140. One end of the threaded shaft 500 passes through the bore 130 and the main gear 300 to be restricted by the reinforcing seat 400, and the threaded shaft 500 is linked with the main gear 300.

Therefore, through the configuration that the reinforcing seat 400 can bear the push of the force, the pressure on the case 100 can be eased.

Additionally, the main gear 300 can include an engaging hole 310, and the engaging hole 310 can be disposed on a main body of the main gear 300 and have an inner thread configured for the threaded shaft 500 to screw therewith.

As shown in FIG. 3, the case 100 can further include a first half case 101, and a second half case 102 assembled with the first half case 101 to form the first receiving space 110 and the second receiving space 120. The annular groove 140 can also be separated into two parts, one part is disposed on the first half case 101, and the other part can be disposed on the second half case 102. As installing the reinforcing seat 400, for example, the reinforcing seat flange 420 can be engaged with the abovementioned the other part of the annular groove 140 on the second half case 102 first, and then the first half case 101 and the second half case 102 can be combined to secure the reinforcing seat 400 at the case 100. Similarly, other components can also be put in the second half case 102 first and then combine the first half case 101 and the second half case 102, thereby increasing the installation convenience.

The case 100 can further include a bearing recess 160 near the bore 130 and disposed within the second receiving space 120. The bearing recess 160, the annular groove 140 and the bore 130 are concentric, and the bearing recess 160 is configured to receive a bushing 1100. The threaded shaft 500 passes through the bore 130 to insert in the bearing recess 160, the engaging hole 310 and a central hole 440 (shown in FIG. 4) of the reinforcing seat 400 to remain the threaded shaft 500 to rotate about the same axis.

Figure 4:
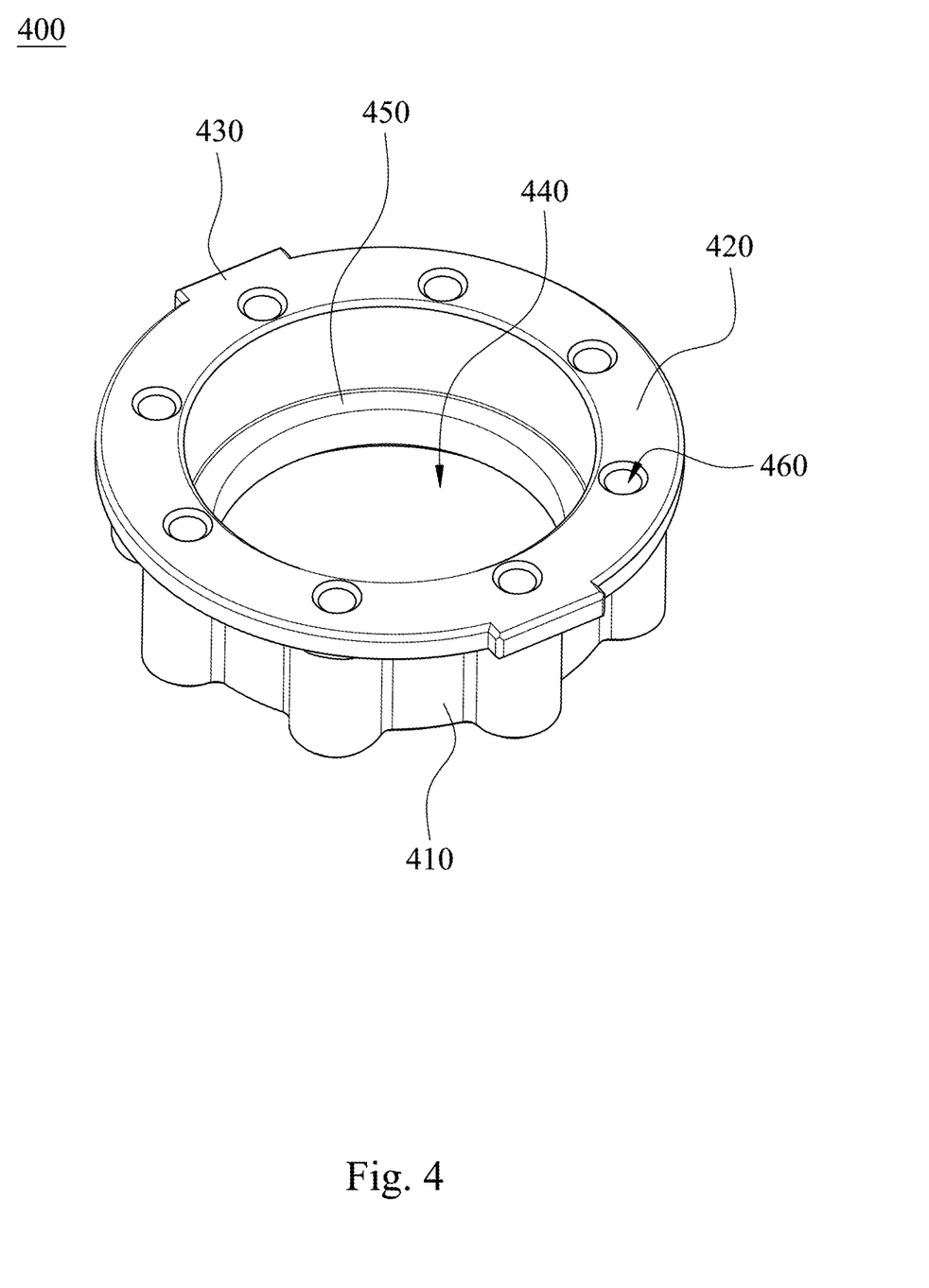
FIG. 4 shows a three-dimensional schematic view of the reinforcing seat of the linear actuator of the embodiment of FIG. 1.

FIG. 4 shows a three-dimensional schematic view of the reinforcing seat 400 of the linear actuator 10 of the embodiment of FIG. 1. Please refer to FIG. 4 with reference to FIGS. 2 and 3, as shown in FIGS. 3 and 4, the case 100 can further include at least one slot 150 extended radially from the annular groove 140 toward an inner wall of the case 100. The reinforcing seat 400 can further include at least one extending portion 430 extended outwardly from the reinforcing seat flange 420 and configured to engage with the at least one slot 150, thereby preventing the rotation of the reinforcing seat 400 relative to the case 100.

The reinforcing seat 400 can further include a central hole 440 penetrating the reinforcing seat body 410, and a bearing ledge 450 disposed at the reinforcing seat body 410 and protruding from the central hole 440 radially. The bearing ledge 450 is configured to restrict a bearing 1000 received in the reinforcing seat 400. The threaded shaft 500 passes through the bearing ledge 450 and the central hole 440. In addition, the linear actuator 10 can further include a spacer 600 sleeved on the end of the threaded shaft 500 that exposes from the reinforcing seat 400. In the embodiment, the bearing 1000 is restricted in the reinforcing seat 400, the end portion of the threaded shaft 500 can pass through the bearing 1000 to be pressed and deformed by, for example, a punch riveting process so as to be restricted with the bearing 1000, and the present disclosure is not limited thereto.

Figure 5:
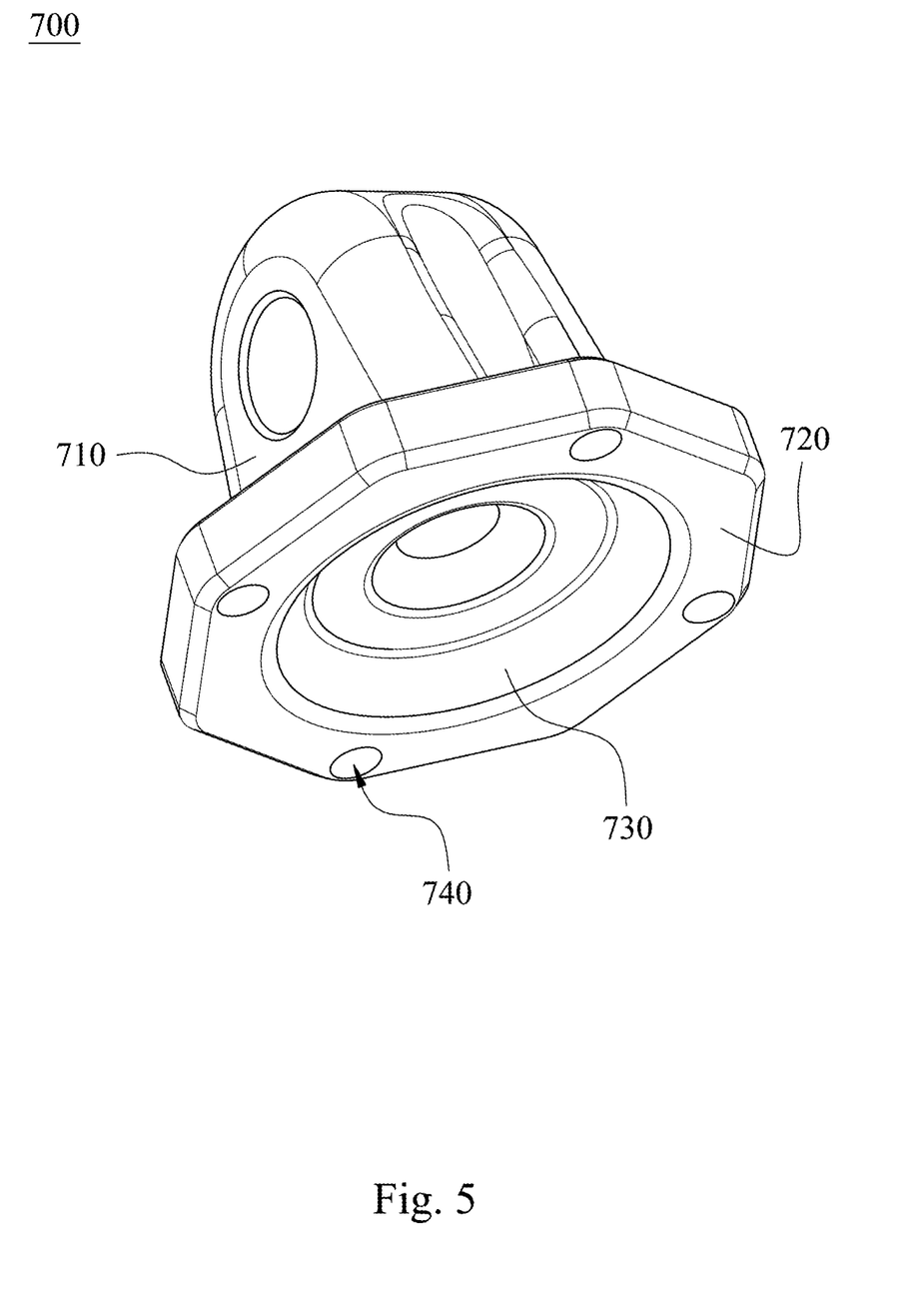
FIG. 5 shows a three-dimensional schematic view of an end cap of the linear actuator of the embodiment of FIG. 1.
Figure 6:
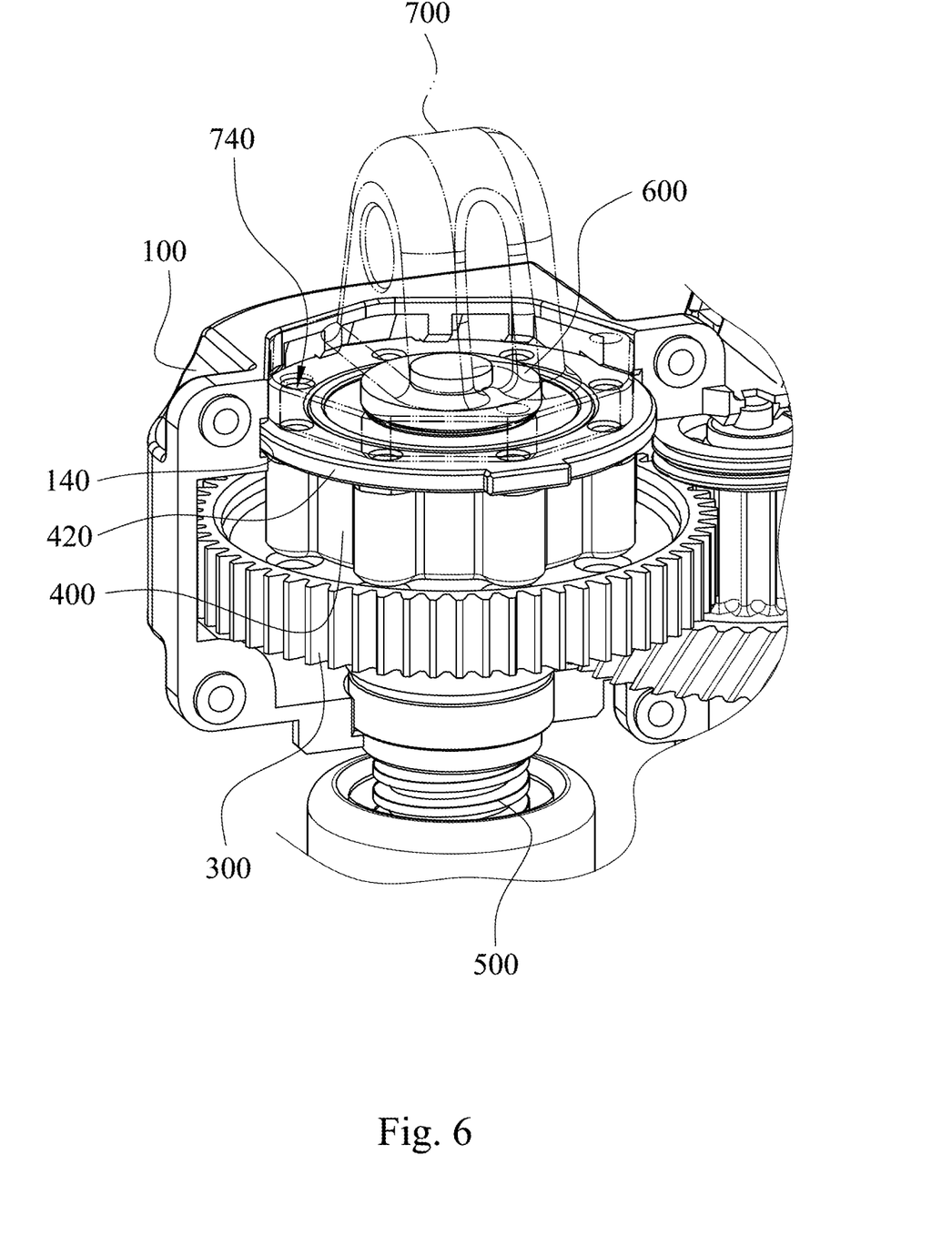
FIG. 6 shows a partial three-dimensional schematic view of the linear actuator of the embodiment of FIG. 1.

FIG. 5 shows a three-dimensional schematic view of an end cap 700 of the linear actuator 10 of the embodiment of FIG. 1. FIG. 6 shows a partial three-dimensional schematic view of the linear actuator 10 of the embodiment of FIG. 1. Please refer to FIGS. 5 and 6 with reference to FIGS. 2 to 4, as shown in FIGS. 4 to 6, the linear actuator 10 can further include an end cap 700 detachably disposed at the reinforcing seat flange 420. The end cap 700 includes an end cap body 710, an end cap flange 720 disposed at the end cap body 710 and configured to connect to the reinforcing seat flange 420, and a cavity 730 disposed at the end cap flange 720 and configured for the spacer 600 to be received therein.

The end cap 700 can further include at least one through hole 740 disposed at the end cap flange 720, and the reinforcing seat 400 can further include at least one installed hole 460 disposed at the reinforcing seat flange 420 and corresponding to the at least one through hole 740. When the end cap 700 is assembled with the reinforcing seat 400, at least one fastening screw 900 passes through the at least one through hole 740 to fasten with the at least one installed hole 460, thereby securing the end cap 700 and the reinforcing seat 400. If the user would like to change the threaded shaft 500 for changing the lead thereof based on demands, the fastening screw 900 can be directly unscrewed to remove the end cap 700, and the assembly convenience can be increased.

Figure 7:
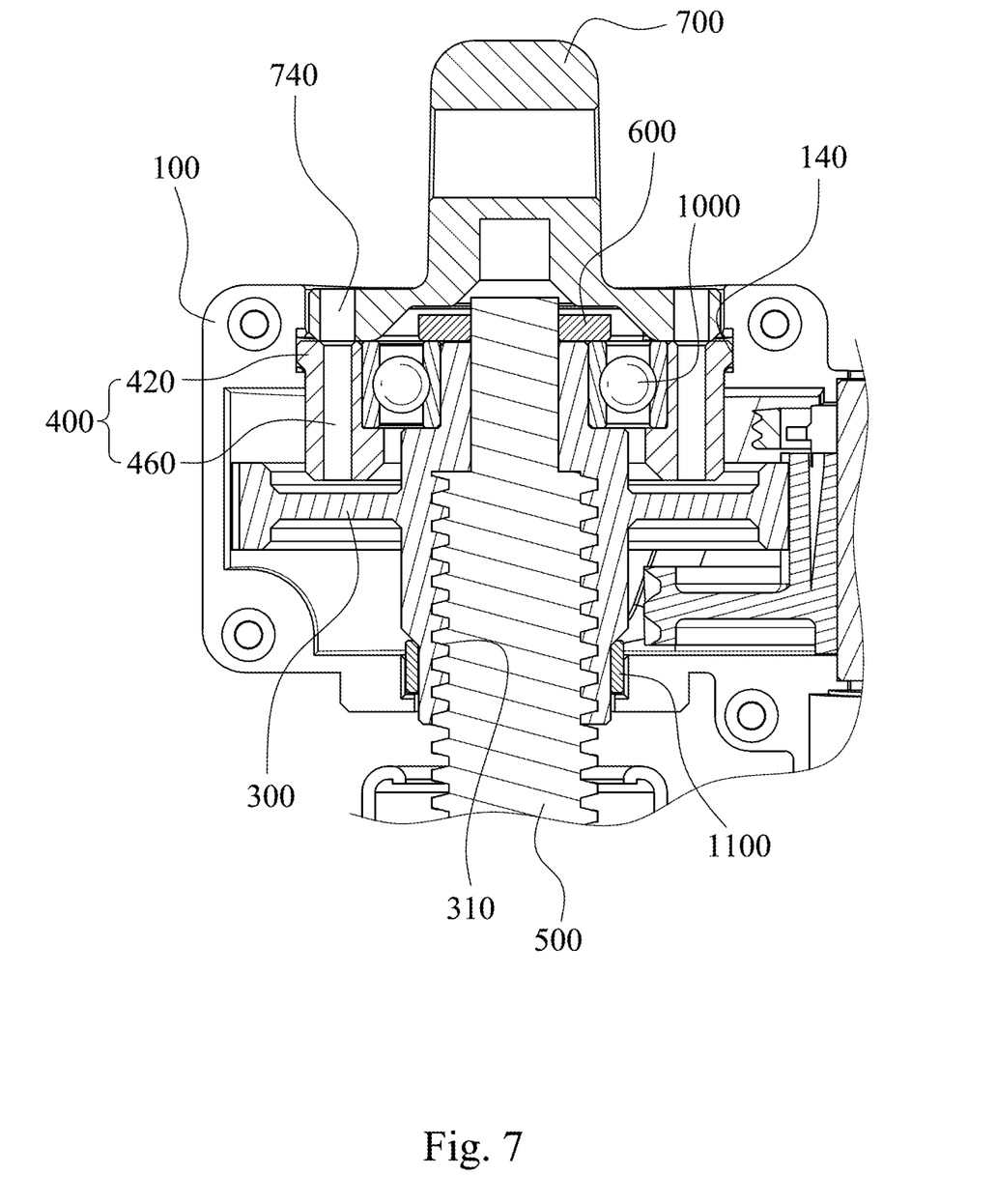
FIG. 7 shows a partial section view of the linear actuator of the embodiment of FIG. 1 taken along line 7-7.

FIG. 7 shows a partial section view of the linear actuator 10 of the embodiment of FIG. 1 taken along line 7-7. As shown in FIG. 7, the reinforcing seat 400 is secured in the case 100 by engaging the reinforcing seat flange 420 with the annular groove 140, and the reinforcing seat 400 is configured to receive the bearing 1000. One end of the main gear 300 is inserted in the bearing 1000, the other end of the main gear 300 is inserted in a bushing 1100, and the bearing 1000 and the bushing 1100 are concentric, thereby allowing the main gear 300 to generally rotate about an axis without swinging. The threaded shaft 500 can be engaged with the engaging hole 310 of the main gear 300 via an outer thread, and the threaded shaft 500 is linked with the main gear 300. Additionally, the end portion of the threaded shaft 500 that exposes form the reinforcing seat 400 can be sleeved by the spacer 600 and be restricted by pressing. The force pushing axially will be generated as the threaded shaft 500 is driven to rotate, and the repeatable forward and reverse rotation will cause forces in opposite directions, which may lead mechanical fatigue. Moreover, vibrations of the case 100 caused by the enlarged force owing to the load added thereto will become serious. Through engaging the reinforcing seat flange 420 into the annular groove 140, the reinforcing seat 400 can share the pressure of the case 100, and the case 100 with thinner wall that bears fewer loads can be used to lower the weight and the cost.

Please refer back to FIG. 1, the linear actuator 10 can further include an elevating structure 800 being connected to and driven by the threaded shaft 500. The elevating structure 800 can be combined with a device to allow the device to move linearly along the axis. Therefore, wide applications of the linear actuator 10 can be achieved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:
1. A linear actuator, comprising:
   a case, comprising:
      a first receiving space;
      a second receiving space communicated with the first receiving space;
      a bore communicated with the second receiving space; and
      an annular groove located at the second receiving space along an axial direction of the bore;
   a driving module disposed within the first receiving space;
   a main gear disposed within the second receiving space and linked with the driving module;
   a reinforcing seat disposed within the second receiving space and connected to the main gear, the reinforcing seat comprising:
      a reinforcing seat body; and
      a reinforcing seat flange connected to the reinforcing seat body and engaged with the annular groove; and a threaded shaft, wherein one end of the threaded shaft passes through the bore and the main gear to be restricted by the reinforcing seat, and the threaded shaft is linked with the main gear.

2. The linear actuator of claim 1, wherein the case further comprises at least one slot extended radially from the annular groove toward an inner wall of the case, and the reinforcing seat further comprises an extending portion extended outwardly from the reinforcing seat flange and configured to engage with the at least one slot.

3. The linear actuator of claim 1, wherein the reinforcing seat further comprises:
   a central hole penetrating the reinforcing seat body; and
   a bearing ledge disposed at the reinforcing seat body and protruding from the central hole radially;
   wherein the threaded shaft passes through the bearing ledge and the central hole.

4. The linear actuator of claim 3, wherein the main gear comprises:
   an engaging hole disposed at a main body of the main gear and having an inner thread configured to fasten with the threaded shaft.

5. The linear actuator of claim 4, wherein the case further comprises:
   a bearing recess near the bore and disposed within the second receiving space, the bearing recess and the annular groove being concentric, wherein the threaded shaft is inserted in the bearing recess, the engaging hole and the central hole.

6. The linear actuator of claim 1, further comprising:
   a spacer sleeved on the end of the threaded shaft that exposes from the reinforcing seat.

7. The linear actuator of claim 6, further comprising an end cap detachably disposed at the reinforcing seat flange, the end cap comprising:
   an end cap body;
   an end cap flange disposed at the end cap body and configured to connect to the reinforcing seat flange; and
   a cavity disposed at the end cap flange and configured for the spacer to be received therein.

8. The linear actuator of claim 7, wherein the end cap further comprises at least one through hole disposed at the end cap flange, the reinforcing seat further comprises at least one installed hole disposed at the reinforcing seat flange and corresponding to the at least one through hole, and when the end cap is assembled with the reinforcing seat, at least one fastening screw passes through the at least one through hole to fasten with the at least one installed hole, thereby securing the end cap and the reinforcing seat.

9. The linear actuator of claim 1, further comprising:
   an elevating structure connected to the threaded shaft and driven by a rotation of the threaded shaft.

10. The linear actuator of claim 1, wherein the case further comprises:
    a first half case; and
    a second half case assembled with the first half case to form the first receiving space and the second receiving space.

* * * * *